US012795535B2

(12) United States Patent
Cheng et al.

(10) Patent No.: US 12,795,535 B2
(45) Date of Patent: Nov. 10, 2026

(54) METHOD AND APPARATUS FOR WAKE-UP SIGNAL TRANSMISSION FOR NETWORK ENERGY SAVING

(71) Applicant: MEDIATEK INC., Hsinchu City (TW)

(72) Inventors: Chien-Chun Cheng, Hsinchu City (TW); Wei-De Wu, Hsinchu City (TW); Yi-Ju Liao, Hsinchu City (TW); Cheng-Hsun Li, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 268 days.

(21) Appl. No.: 18/706,332

(22) PCT Filed: Mar. 20, 2023

(86) PCT No.: PCT/CN2023/082602

§ 371 (c)(1),
(2) Date: Apr. 30, 2024

(87) PCT Pub. No.: WO2023/179565

PCT Pub. Date: Sep. 28, 2023

(65) Prior Publication Data

US 2026/0129572 A1 May 7, 2026

Related U.S. Application Data

(60) Provisional application No. 63/321,856, filed on Mar. 21, 2022.

(51) Int. Cl.
*H04W 52/02* (2009.01)
*H04W 48/20* (2009.01)

(52) U.S. Cl.
CPC ....... *H04W 52/0206* (2013.01); *H04W 48/20* (2013.01)

(58) Field of Classification Search
CPC ................................................ H04W 52/0206
See application file for complete search history.

(56) References Cited

U.S. PATENT DOCUMENTS

| | | | | |
|---|---|---|---|---|
| 9,301,225 | B2 | 3/2016 | Comsa | |
| 2011/0044220 | A1 * | 2/2011 | Park | H04W 76/28 370/311 |

(Continued)

FOREIGN PATENT DOCUMENTS

CN 102714812 A 10/2012

OTHER PUBLICATIONS

International Search Report dated May 12, 2023, issued in application No. PCT/CN2023/082602.

(Continued)

*Primary Examiner* — Rasheed Gidado
(74) *Attorney, Agent, or Firm* — Andy M. Han; Han IP PLLC

(57) ABSTRACT

Various solutions for wake-up signal (WUS) transmission for network energy saving with respect to user equipment and network apparatus in mobile communications are described. An apparatus may receive information for waking up a sleeping cell from a network node. The apparatus may transmit a WUS to the network node based on the information to wake up the sleeping cell. The WUS is used to request a transition from no or reduced transmission or reception activity to active transmission or reception activity of a channel or a signal, or is used to trigger a synchronization signal block (SSB) or system information block (SIB) transmission.

14 Claims, 11 Drawing Sheets

(56) References Cited

U.S. PATENT DOCUMENTS

| | | | | |
|---|---|---|---|---|
| 2017/0048918 | A1* | 2/2017 | Iwamura | H04W 76/27 |
| 2019/0110244 | A1* | 4/2019 | Shih | H04W 76/27 |
| 2020/0029316 | A1 | 1/2020 | Zhou | |
| 2020/0084798 | A1* | 3/2020 | Peisa | H04W 72/542 |
| 2020/0100179 | A1 | 3/2020 | Zhou | |
| 2020/0162939 | A1* | 5/2020 | Kim | H04W 16/28 |
| 2021/0297959 | A1 | 9/2021 | Zhou et al. | |
| 2022/0022067 | A1 | 1/2022 | Kim et al. | |
| 2022/0240253 | A1* | 7/2022 | Sakhnini | H04L 5/0048 |
| 2023/0043142 | A1* | 2/2023 | Ly | H04W 52/0258 |
| 2024/0205829 | A1* | 6/2024 | Ma | H04W 76/15 |

OTHER PUBLICATIONS

Taiwan Intellectual Property Office, Office Action for Taiwan Patent Application No. 112110420, Apr. 29, 2026.

* cited by examiner

METHOD AND APPARATUS FOR WAKE-UP SIGNAL TRANSMISSION FOR NETWORK ENERGY SAVING

CROSS REFERENCE TO RELATED PATENT APPLICATION(S)

The present disclosure claims the priority benefit of U.S. Provisional Patent Application No. 63/321,856, filed on 21 Mar. 2022. The content of aforementioned application is herein incorporated by reference in its entirety.

TECHNICAL FIELD

The present disclosure is generally related to mobile communications and, more particularly, to wake-up signal transmission for network energy saving with respect to user equipment (UE) and network apparatus in mobile communications.

BACKGROUND

Unless otherwise indicated herein, approaches described in this section are not prior art to the claims listed below and are not admitted as prior art by inclusion in this section.

The fifth-generation (5G) network, despite its enhanced energy efficiency in bits per Joule (e.g., 417% more efficiency than a 4G network) due to its larger bandwidth and better spatial multiplexing capabilities, may consume over 140% more energy than a 4G network.

For energy saving, 5G network may activate a sleep mode for a base station (BS) with low traffic loads. The sleep mode may turn off a power amplifier and other power-wasting components to save energy. When the traffic loads increase, network may deactivate the sleep mode for the base stations to balance the workload of neighboring base stations.

In order to deactivate the sleep mode, a signal used to wake up a base station is defined as a base station-wake-up signal (BS-WUS). The base station may receive the signal from the core 5G network or user equipments (UEs). However, it is unclear how the BS-WUS mechanism works in convention technologies.

Accordingly, how to transmit WUS becomes an important issue for the newly developed wireless communication network. Therefore, there is a need to provide proper schemes for WUS transmission for UE.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to transmit the wake-up signal (WUS) for network energy saving with respect to user equipment and network apparatus in mobile communications.

In one aspect, a method may involve an apparatus receiving information for waking up a sleeping cell from a network node. The method may also involve the apparatus transmitting a WUS to the network node based on the information to wake up the sleeping cell. The WUS is used to request a transition from no or reduced transmission or reception activity to active transmission or reception activity of a channel or a signal, or is used to trigger a synchronization signal block (SSB) or system information block (SIB) transmission.

In one aspect, a method may involve an apparatus transmitting information for waking up a sleeping cell to a user equipment (UE). The method may also involve the apparatus receiving a WUS from the UE to wake up the sleeping cell. The WUS is used to request a transition from no or reduced transmission or reception activity to active transmission or reception activity of a channel or a signal, or is used to trigger an SSB or SIB transmission.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to using on-demand reference signal for network energy saving with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

The present disclosure proposes several schemes pertaining to transmit wake-up signal (WUS) for network energy saving with respect to UE and network apparatus in mobile communications.

In accordance with implementations of the present disclosure, the "sleeping cell" or the "cell in sleeping mode" may be defined as the cell has no transmission activity or reception activity, or the cell has reduced transmission activity or reception activity. The sleeping cell may be waked up by the WUS signal. The WUS signal is used to request transmission from no or reduced transmission or reception activity to activate transmission or reception activity of a channel or a signal before the sleeping cell has been waked up. In addition, the WUS signal is used to trigger a synchronization signal (SS)/physical broadcast channel (PBCH) block (SSB) or system information block (SIB) transmission after the sleeping cell has been waked up.

A network node may enter energy savings autonomously by monitoring the current traffic load, but the network node may be unclear whether it can leave the sleep mode autonomously without base station (BS)-WUS. Therefore, the present disclosure proposes some solutions to resolve the issues.

Figure 1:
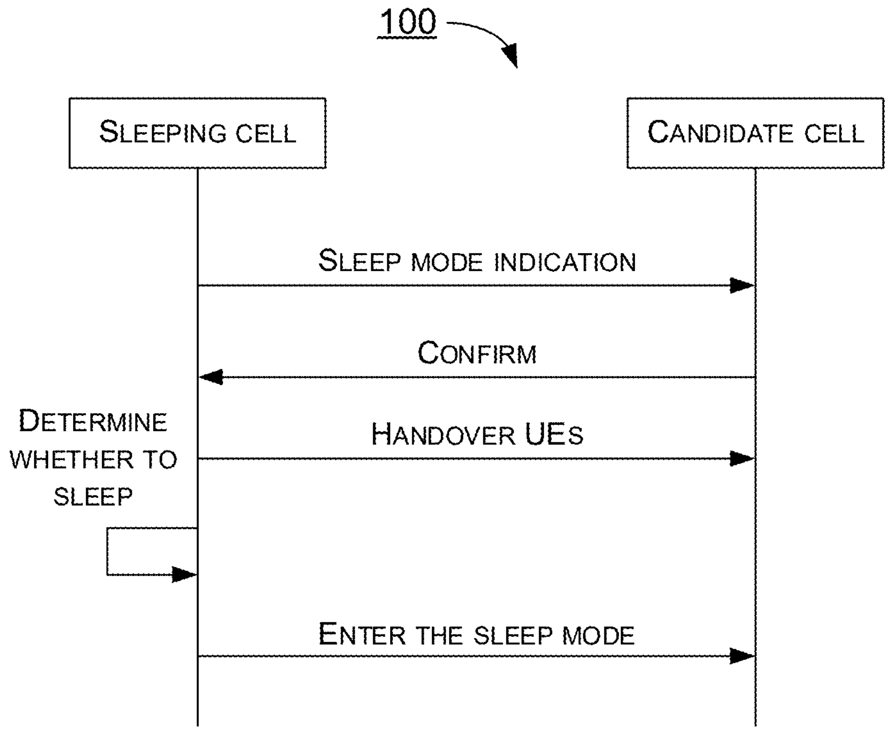
FIG. 1 is a diagram depicting an example scenario of determining whether to sleep under schemes in accordance with implementations of the present disclosure.

FIG. 1 illustrates an example scenario 100 of determining whether to sleep under schemes in accordance with implementations of the present disclosure. Scenario 100 involves a plurality of network nodes (e.g., a macro base station and multiple micro base stations) and a plurality of UEs, which may be a part of a wireless communication network (e.g., an LTE network, a 5G/NR network, an IoT network or a 6G network). Before a service provider (e.g., a network node) enters a sleep mode, the service provider may select candidate cells to maintain its coverage. The service provider may inform the candidate cell using a sleep mode indication (SMI). In addition, the service provider may offload its serving UEs to the candidate cells. The service provider may determine whether to enter the sleep mode based on whether the current served UEs have been transferred to the candidate cell. For example, for RRC_CONNECTED UEs, the service provider may use a handover (HO) message to move the RRC_CONNECTED UEs to the candidate cell. In another example, for RRC_IDLE UEs, the service provider may use cell reselection priority via the system information to transfer the RRC_IDLE UEs to camp on the candidate cell. Before the service provider enters the sleep mode, the service provider may need to finish transferring all served UEs to the candidate cell. In addition, the service provider may receive a threshold from the core network to determine how many RRC_CONNECTED UEs or how many RRC_IDLE UEs can be left the service, e.g., the number of UEs the service provider may not be able to transfer to the candidate cell before the service provider enters the sleep mode. When the service provider enters the sleep mode, the service provider may inform the candidate cell that the service provider has entered the sleeping mode.

Figure 2:
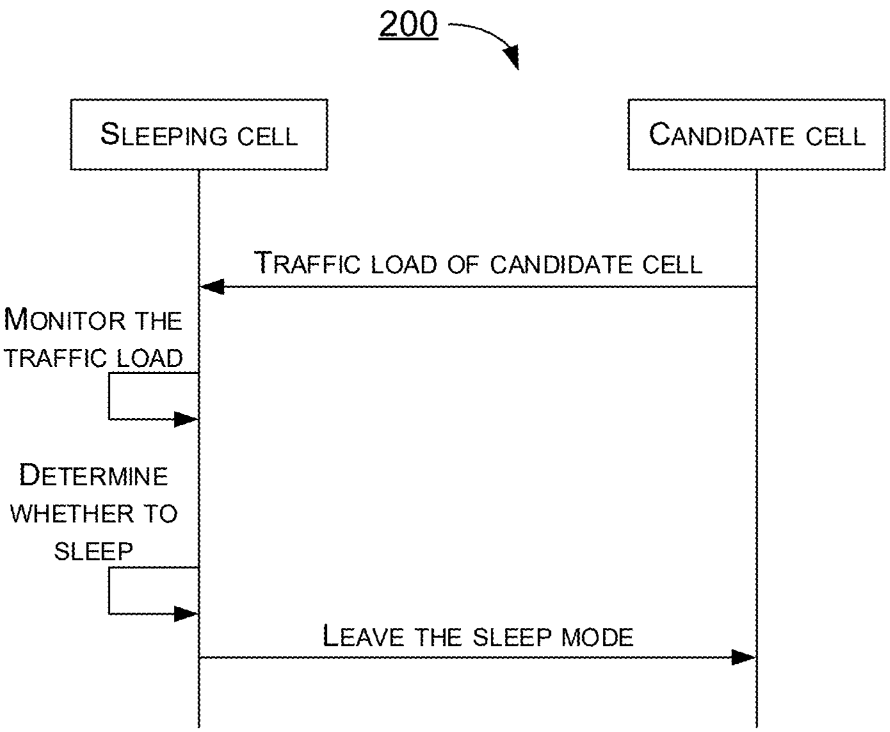
FIG. 2 is a diagram depicting an example scenario of determining whether to wake up under schemes in accordance with implementations of the present disclosure.

FIG. 2 illustrates an example scenario 200 of determining whether to wake up under schemes in accordance with implementations of the present disclosure. Scenario 200 involves a plurality of network nodes (e.g., a macro base station and multiple micro base stations) and a plurality of UEs, which may be a part of a wireless communication network (e.g., an LTE network, a 5G/NR network, an IoT network or a 6G network). When the service provider has entered the sleep mode, the service provider (e.g., the network node in the sleeping cell) may monitor the traffic load of the candidate cell and decide to leave the sleeping mode when the service provider detects that additional capacity is needed. The sleeping cell may be waked up by the candidate cell using an indication. The candidate cell may provide a condition for the sleeping cell to wake up, e.g., the candidate cell's traffic load is beyond a threshold. The traffic load may be defined by the number of RRC_CONNECTED UEs or recourse utilization rates (RU). When the service provider is waked up, the service provider may inform the candidate cell that the service provider has left the sleeping mode (i.e., the service provider has left the energy-saving state).

Before the sleeping cell enters the sleeping mode, the network node may need to finish the offload. For example, for RRC_CONENCTED UEs, the network node needs to wait for measurement reports from UEs to determine a handover decision. As a result, the measurement control and reports may decrease the offload efficiency. In order to the above issue, the present disclosure may propose some solutions to resolve the issue below.

Figure 3:
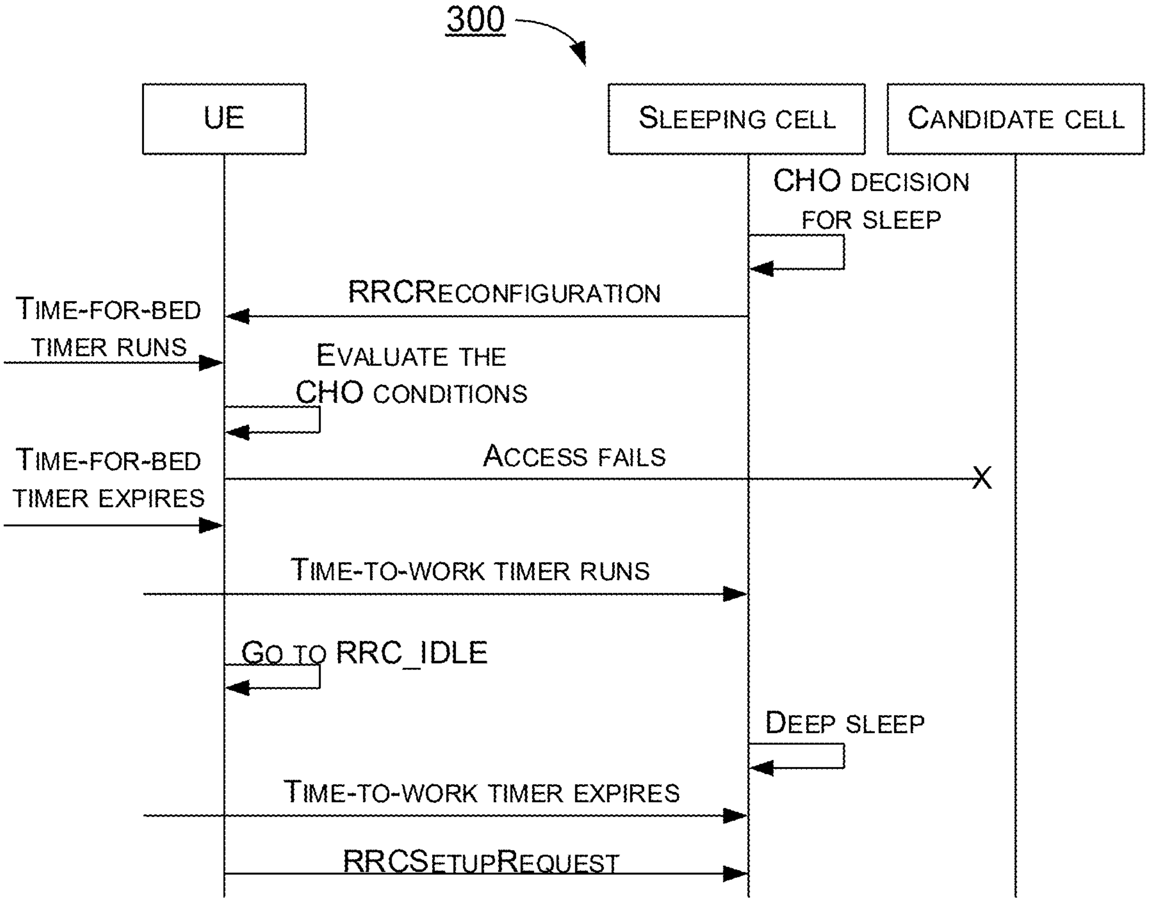
FIG. 3 is a diagram depicting an example scenario of a conditional handover (CHO) under schemes in accordance with implementations of the present disclosure.

FIG. 3 illustrates an example scenario 300 of a conditional handover (CHO) under schemes in accordance with implementations of the present disclosure. Scenario 300 involves a plurality of network nodes (e.g., a macro base station and multiple micro base stations) and a plurality of UEs, which may be a part of a wireless communication network (e.g., an LTE network, a 5G/NR network, an IoT network or a 6G network). For an RRC_CONNECTED UE, the network node in sleeping cell may provide a list of candidate cells, the CHO conditions when the network node enters the sleep mode, and the CHO conditions when the network node leaves the sleep mode. The UE may determine at least one of the candidate cells to access before the network node enters the sleep mode. In an example, the list of candidate cells may be determined by the network node based on the coverage of the network node and the neighboring cells. In another example, the list of candidate cells may be provided to the network node from the core network after a sleep request has been sent to the core network. The CHO condition may be Event A4, i.e., neighbor becomes better than the threshold. The network node may configure the referenced reference signal received power (RSRP) and a list of cell IDs. The UE may determine one cell from the list by the measured RSRP.

As shown in FIG. 3, the time when the network node will sleep may be provided as a timer to the UE, e.g., time-for-bed-timer. The timer may run when the RRCReconfiguration with the CHO conditions is received by the UE for the sleep of the network node. The timer may expire when the network node sleeps. In addition, the timer may be stopped when the UE connects to a candidate cell. When the timer expires, the UE may determine whether to go to the RRC_IDLE or maintain the current connection with the sleeping cell. The RRCReconfiguration may provide the above information via radio resource control (RRC) signaling.

Furthermore, as shown in FIG. 3, the time when the network node will wake up may be provided as a timer to the UE, e.g., time-to-work-timer. The time-to-work-timer may run when the RRCReconfiguration with the CHO conditions is received by the UE for the sleep of the network node, or the time-to-work-timer may run when the time-for-bed-timer expires. The time-to-work-timer may expire when the network node wakes up. In addition, the time-to-work-timer may be stopped when the UE connects to the sleeping cell. When the time-to-work-timer expires, the UE may determine whether to resume the RRC_CONNECTED to the sleeping cell, e.g., the UE may transmit RRCSetupRequest to the sleeping cell. The RRCReconfiguration may provide the above information via RRC signaling.

For an RRC_IDLE UE, the UE may camp on a cell that will sleep in no time. In this case, the UE may attempt to access the cell but quickly return to idle mode. In order to avoid the redundancy, the cell may provide assistant information about its sleep period to the UE. The assistant information may comprise at least one of a sleeping cell indication (SCI), time information, cellBarred bit, sleeping-cellBarred bit, and so on. The present disclosure may propose some implementations of the assistance information below.

In accordance with implementations of the present disclosure, the assistance information may be broadcasted in the system information blocks (SIBs) (e.g., SIB1, SIB2, or SIB4, may provide a sleeping cell indication (SCI)) when the network node will sleep and when the network node will wake up.

The SCI may be a one-bit indicator. When the signal is present in a cell via system information (SI), the UE may assume that the cell is in sleep mode. Otherwise, the UE may assume that the cell is in the normal mode. The UE may not select a sleeping cell to camp on or not select a cell whose priority is lower a sleeping cell's priority to camp on using additional offset, e.g., Qrxlevminoffset, Qqualminoffset, or Qoffsettemp. The UE may start performing intra-frequency or inter-frequency measurements for cell reselection if the indication is present in the camped cell.

Figure 4:
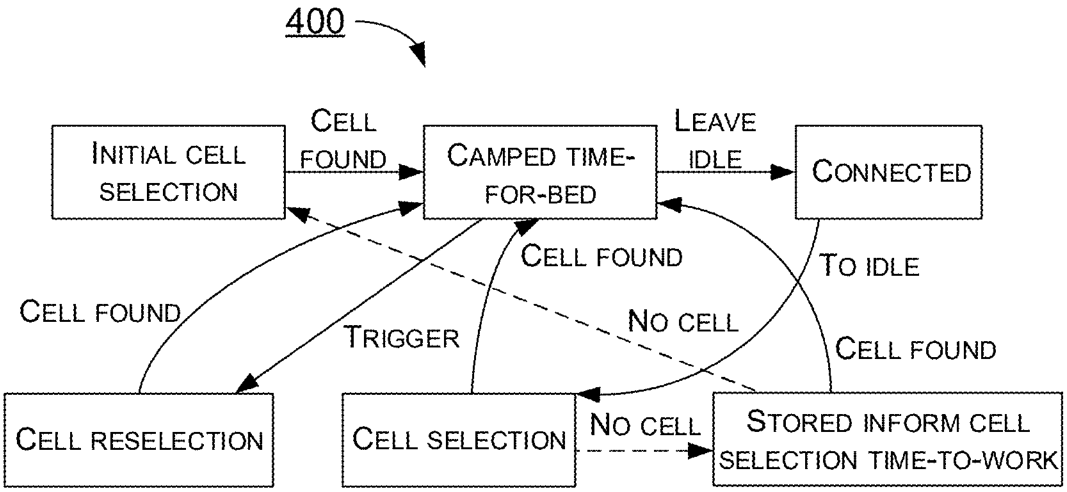
FIG. 4 is a diagram depicting an example scenario of time information under schemes in accordance with implementations of the present disclosure.

FIG. 4 illustrates an example scenario 400 of time information under schemes in accordance with implementations of the present disclosure. Scenario 400 involves a plurality of network nodes (e.g., a macro base station and multiple micro base stations) and a plurality of UEs, which may be a part of a wireless communication network (e.g., an LTE network, a 5G/NR network, an IoT network or a 6G network).

As shown in FIG. 4, the time information associated with the network node which will sleep may provide a duration before the cell becomes idle and this time information is denoted by time-for-bed-info. If the time information is present in a SIB, the UE may start to perform intra-frequency or inter-frequency measurements for cell reselection before the duration ends. The time-for-bed-info may include a period of time, e.g., 160 ms, 1 second, or 1 minute. This time information may be used when the UE is camped normally and when the UE triggers cell reselection.

As shown in FIG. 4, the time information associated with the network which will wake up may provide a duration before the cell becomes active and this time information is denoted by time-to-work-info. If the time information is present in a SIB, the UE may store the time information and use the time information for cell selection or initial cell selection. The time-to-work-info may include a period of time, e.g., 160 ms, 1 second, or 1 minute. This time information may be used when the UE uses the stored data for cell selection or initial cell selection.

Figure 5:
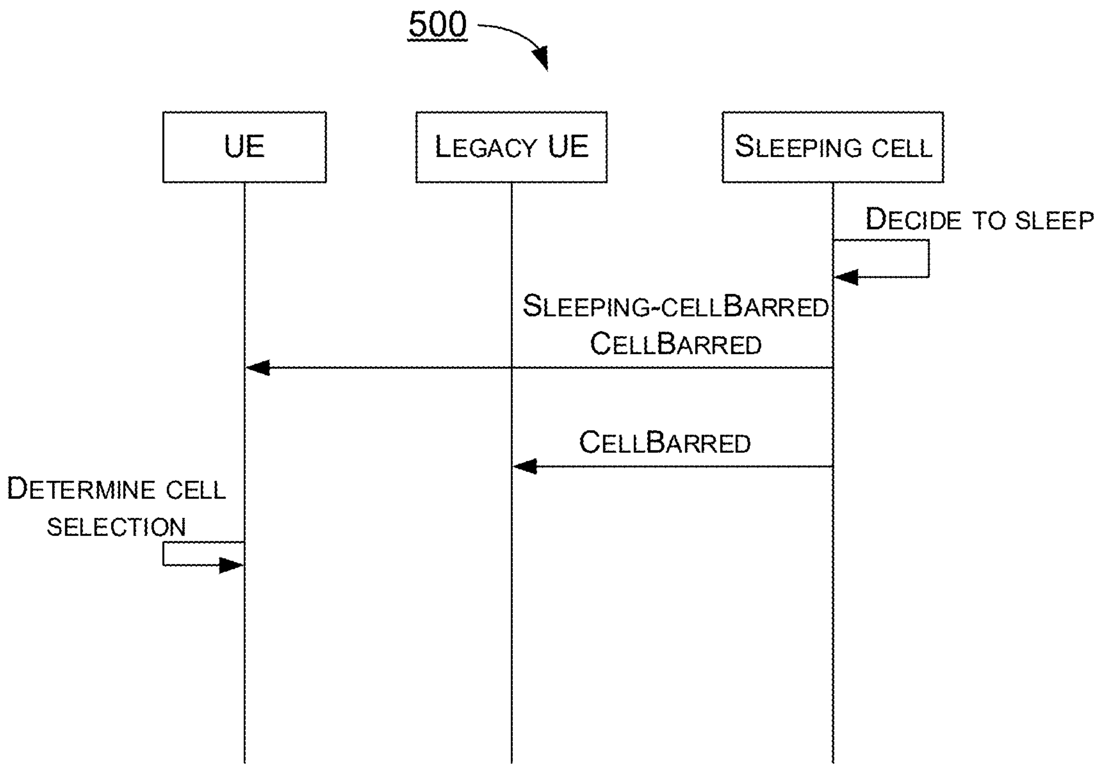
FIG. 5 is a diagram depicting an example scenario of a cellBarred bit and a sleeping-cellBarred bit under schemes in accordance with implementations of the present disclosure.

FIG. 5 illustrates an example scenario 500 of a cellBarred bit and a sleeping-cellBarred bit under schemes in accordance with implementations of the present disclosure. Scenario 500 involves a plurality of network nodes (e.g., a macro base station and multiple micro base stations) and a plurality of UEs, which may be a part of a wireless communication network (e.g., an LTE network, a 5G/NR network, an IoT network or a 6G network). A bit field cellBarred may be used in master information block (MIB). The field which has a one-bit value of barred means that the cell is barred. A network node that decides to enter energy saving may set cellBarred bit in MIB to be barred. An RRC_IDLE UE may be not allowed to camp on a barred cell. This solution is equivalent to set the time-to-bed timer to zero. However, the cellBarred bit may be used to reject all UE access for a case when a cell is close to the maximum load limit rather than a case when there is no traffic load. For a sleeping cell, a new sleeping-cellBarred information element (IE) may be introduced in SIB1. The sleeping-cellBarred bit is used to bar the sleeping cell access for the new UEs. For example, if cellBarred bit is set to "notBarred" and sleeping-cellBarred bit is set to "barred," a new RRC_IDLE UE may be not allowed to camp on the sleeping cell, but a legacy UE may be allowed to camp on the sleeping cell.

For another example, a sleeping cell may use the cellBarred bit to reject all UE. However, the sleeping cell may provide another indication in MIB or SIB1, e.g., can-be-wake-up, for UE to wake up the sleeping cell. The legacy UE may not camp on the sleeping cell. The new UE may read the new indication, i.e., can-be-wake-up, to transmit a wake-up-signal (WUS), e.g., a pre-defined physical random access channel (PRACH), or the legacy random access channel (RACH) procedure. The pre-defined PRACH or the legacy RACH configuration may be transmitted via SIB1 or other SIBs.

If the sleeping cell is turning off due to a mistake, the core network may wake it up in no time. This may become inefficient to bring all previous UEs back from the candidate cells. Therefore, the present disclosure proposes some solutions to resolve the issues.

Figure 6:
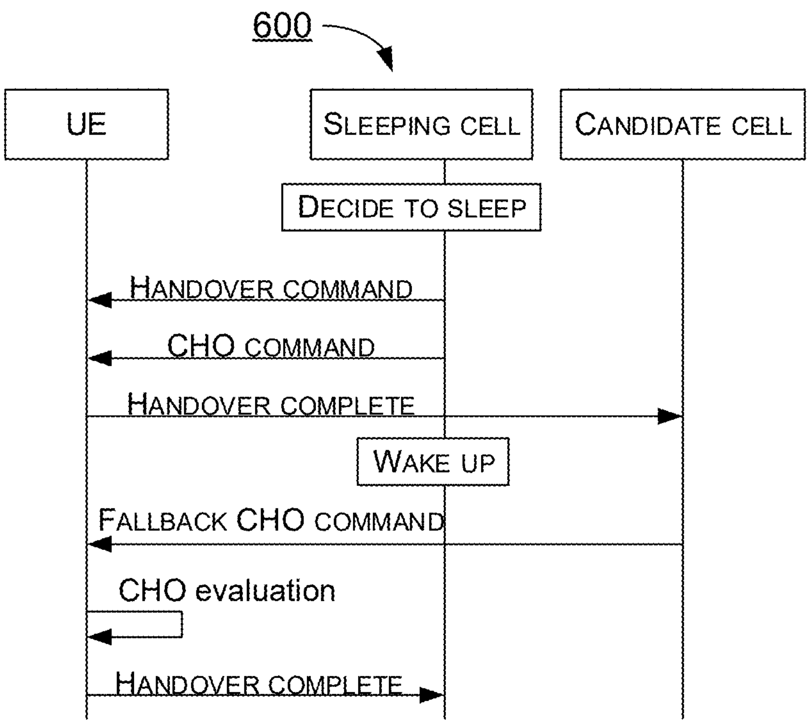
FIG. 6 is a diagram depicting an example scenario of a CHO configuration under schemes in accordance with implementations of the present disclosure.

FIG. 6 illustrates an example scenario 600 of a CHO configuration under schemes in accordance with implementations of the present disclosure. Scenario 600 involves a plurality of network nodes (e.g., a macro base station and multiple micro base stations) and a plurality of UEs, which may be a part of a wireless communication network (e.g., an LTE network, a 5G/NR network, an IoT network or a 6G network). The sleeping cell may provide assistant information with the handover command, e.g., SSB and SIB1 configuration, to the UE. The UE may store this assistant information after completing the handover procedure to the candidate cell. This assistant information may facilitate connecting back the sleeping cell once the sleeping cell has woken up. In addition, the sleeping cell may provide a CHO configuration with a CHO command before the UE detaches the sleeping cell. The UE may connect back if the configured CHO condition in the CHO configuration is met. Alternatively, the candidate cell may provide a CHO configuration with a fallback CHO command after the UE attaches the candidate cell. The core network may give a reasonable period to call UE back.

A problem of monitoring the traffic load of candidate cells via the core network may be that the sleeping cell may wake up, but no UE is around. This issue occurs because all traffic may be around the candidate cells. Therefore, the present disclosure proposes some solutions to resolve the issues.

Figure 7:
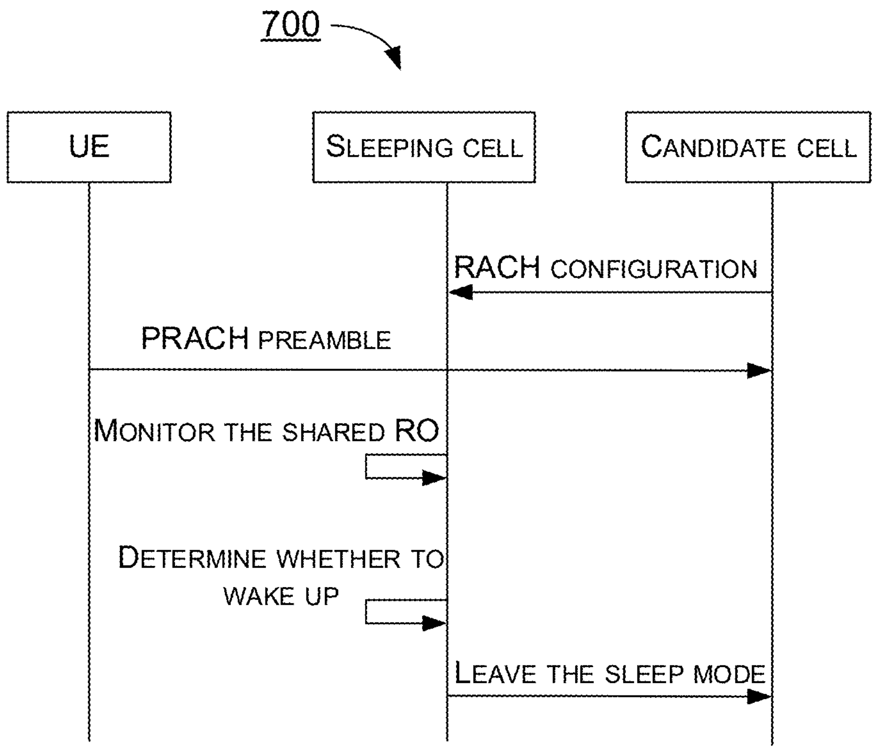
FIG. 7 is a diagram depicting an example scenario of monitoring traffic load of candidate cell under schemes in accordance with implementations of the present disclosure.

FIG. 7 illustrates an example scenario 700 of monitoring traffic load of candidate cell under schemes in accordance with implementations of the present disclosure. Scenario 700 involves a plurality of network nodes (e.g., a macro base station and multiple micro base stations) and a plurality of UEs, which may be a part of a wireless communication network (e.g., an LTE network, a 5G/NR network, an IoT network or a 6G network). A sleeping cell may receive PRACH preambles from UEs if the sleeping cell and the candidate cells share the same RACH configuration. The sleeping cell may monitor the RACH occasion (RO) to detect the UE's access to the candidate cell. When the sleep cell detects a PRACH preamble of the UE, the UE may be likely around the sleeping cell or in a good beam direction to the sleeping cell.

However, the random access may be triggered by many events, e.g., Request for Other SI, Beam failure recovery, Scheduling Request (SR) failure, etc. As a result, only monitoring the RO may mislead the traffic load. Therefore, the present disclosure proposes some solutions to resolve the issues.

Figure 8:
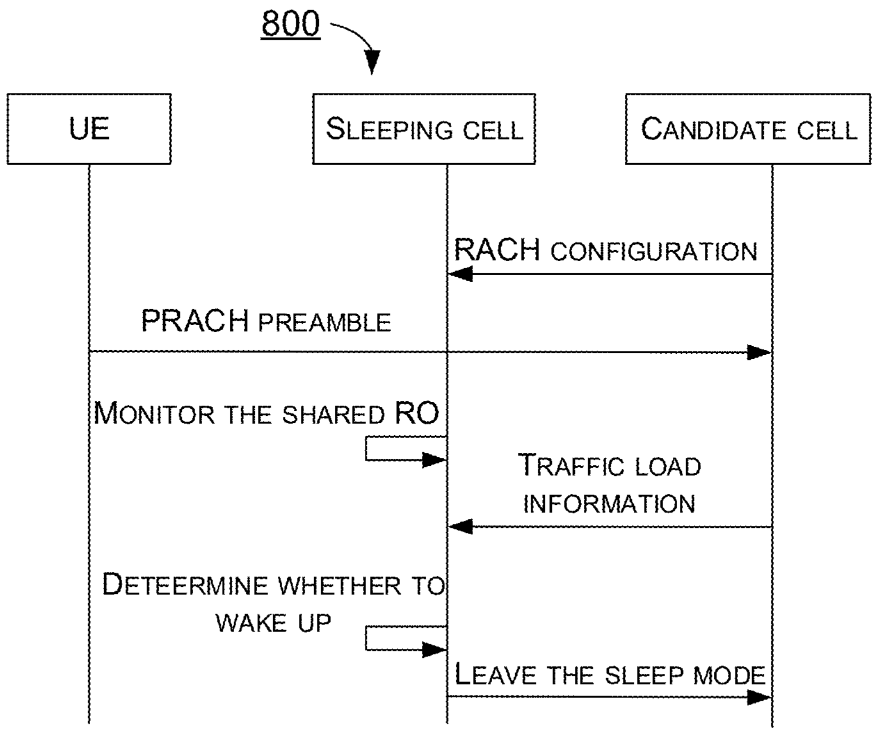
FIG. 8 is a diagram depicting an example scenario of traffic load information from candidate cell under schemes in accordance with implementations of the present disclosure.

FIG. 8 illustrates an example scenario 800 of traffic load information from candidate cell under schemes in accordance with implementations of the present disclosure. Scenario 800 involves a plurality of network nodes (e.g., a macro base station and multiple micro base stations) and a plurality of UEs, which may be a part of a wireless communication network (e.g., an LTE network, a 5G/NR network, an IoT network or a 6G network). The sleeping cell may determine whether to wake up based on the number of detected PRACH preambles and the traffic load information from the candidate cells. The candidate cells may provide any new random access procedure triggered by Initial access from RRC_IDLE UEs. The sleeping cell may determine whether it monitors the corresponding PRACH preambles.

However, when the UE is near the sleeping cell, but the sleeping cell may not receive the PRACH preamble due to beam direction mismatched. Therefore, the present disclosure proposes some solutions to resolve the issues.

If the sleeping cell has no SSB transmission, the UE may not find the correct beam direction to reach the sleeping cell. Therefore, in accordance with implementations of the present disclosure, the UE may receive an indication to select the omnidirectional beam to transmit Msg1 and Msg3 of random access procedure. The indication may be transmitted via SIB.

Figure 9:
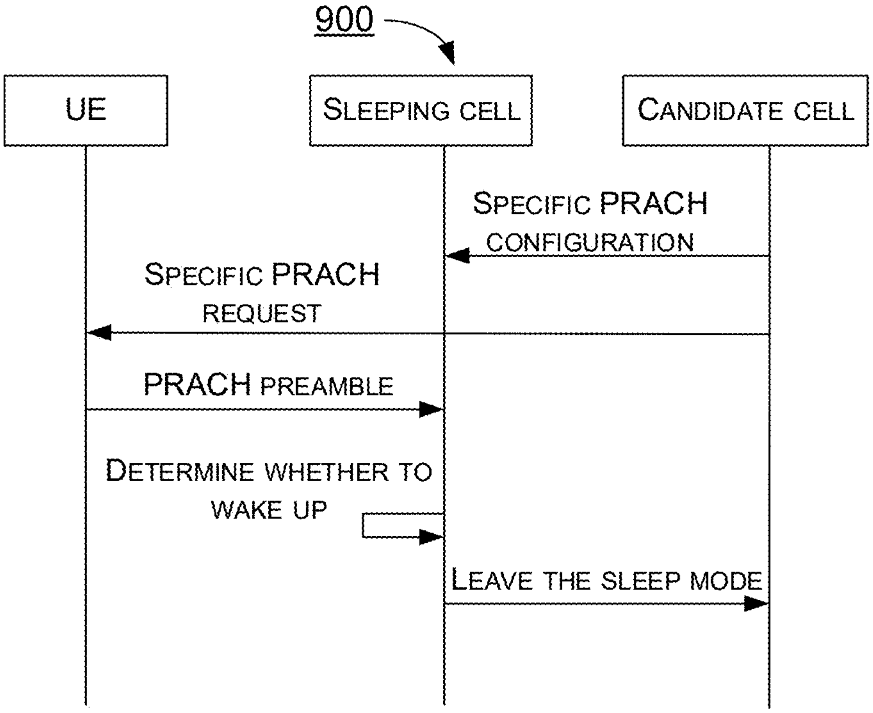
FIG. 9 is a diagram depicting an example scenario of specific PRACH configuration under schemes in accordance with implementations of the present disclosure.

FIG. 9 illustrates an example scenario 900 of specific PRACH configuration under schemes in accordance with implementations of the present disclosure. Scenario 900 involves a plurality of network nodes (e.g., a macro base station and multiple micro base stations) and a plurality of UEs, which may be a part of a wireless communication network (e.g., an LTE network, a 5G/NR network, an IoT network or a 6G network). In order to support multiple sleeping cells, the candidate cell may transmit a specific PRACH request to request a particular PRACH from the UE to wake up a targeted sleeping cell. In an example, the specific PRACH configuration may be signaled via downlink control information (DCI) for RRC_CONNECTED UE. In another example, the specific PRACH configuration may be signaled via SIB for RRC_IDLE UE. In this case, the specific PRACH configuration may be beam-specific to prevent waking up all the sleeping cells. If the UE receives the specific PRACH configuration, the UE may use the specific PRACH configuration as a BS-WUS to wake up a sleeping cell. The sleeping cell may determine whether to wake up based on the number of detected PRACH preambles from the UE.

Figure 10A:
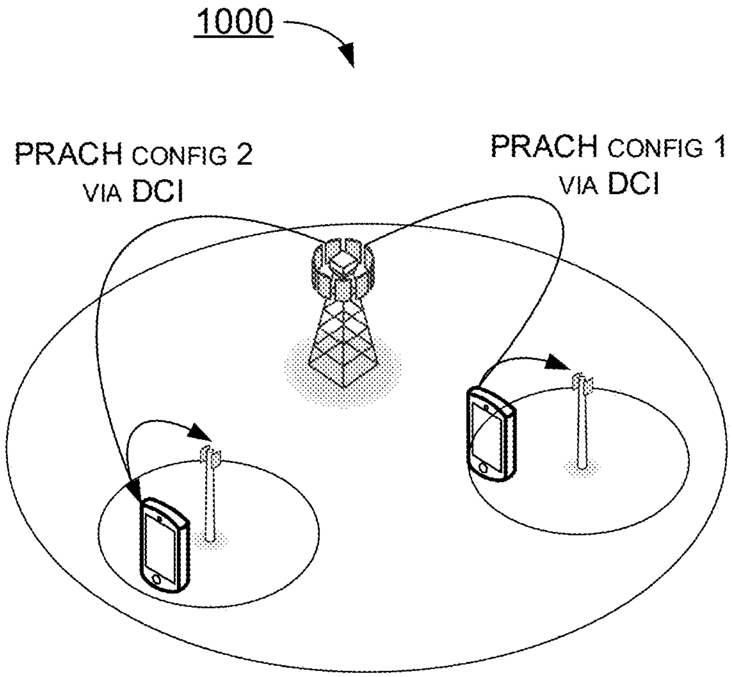
FIG. 10A is a diagram depicting an example scenario of specific PRACH configuration for RRC_CONNECTED UEs under schemes in accordance with implementations of the present disclosure.

FIG. 10A illustrates an example scenario 1000 of specific PRACH configuration for RRC_CONNECTED UEs under schemes in accordance with implementations of the present disclosure. Scenario 1000 involves a plurality of network nodes (e.g., a macro base station and multiple micro base stations) and a plurality of UEs, which may be a part of a wireless communication network (e.g., an LTE network, a 5G/NR network, an IoT network or a 6G network). As shown in FIG. 10A, the specific PRACH configurations (e.g., PRACH config 1 and PRACH config 2) may be signaled via DCI for RRC_CONNECTED UEs.

Figure 10B:
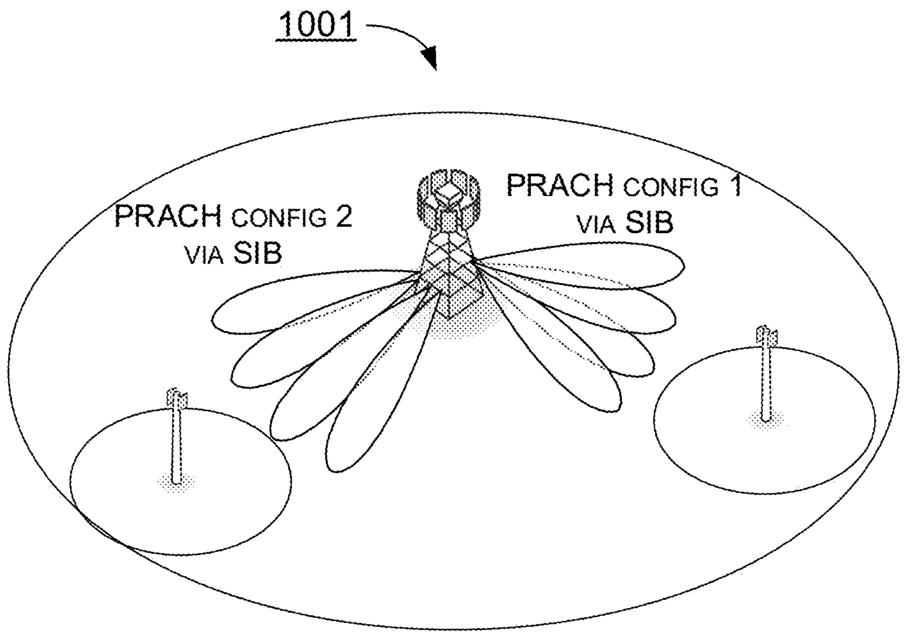
FIG. 10B is a diagram depicting an example scenario of specific PRACH configuration for RRC_IDLE UEs under schemes in accordance with implementations of the present disclosure.

FIG. 10B illustrates an example scenario 1001 of specific PRACH configuration for RRC_IDLE UEs under schemes in accordance with implementations of the present disclosure. Scenario 1001 involves a plurality of network nodes (e.g., a macro base station and multiple micro base stations) and a plurality of UEs, which may be a part of a wireless communication network (e.g., an LTE network, a 5G/NR network, an IoT network or a 6G network). As shown in FIG. 10B, the specific PRACH configurations (e.g., PRACH config 1 and PRACH config 2) may be signaled via SIB for RRC_IDLE UEs.

The sleeping cell may know the locations of UEs and the traffic load of the candidate cells by monitoring the shared ROs. However, this indirect information may not ensure UE must access the sleeping cell, and the network node must be waked up. Therefore, the present disclosure proposes some solutions to resolve the issues.

Figure 11:
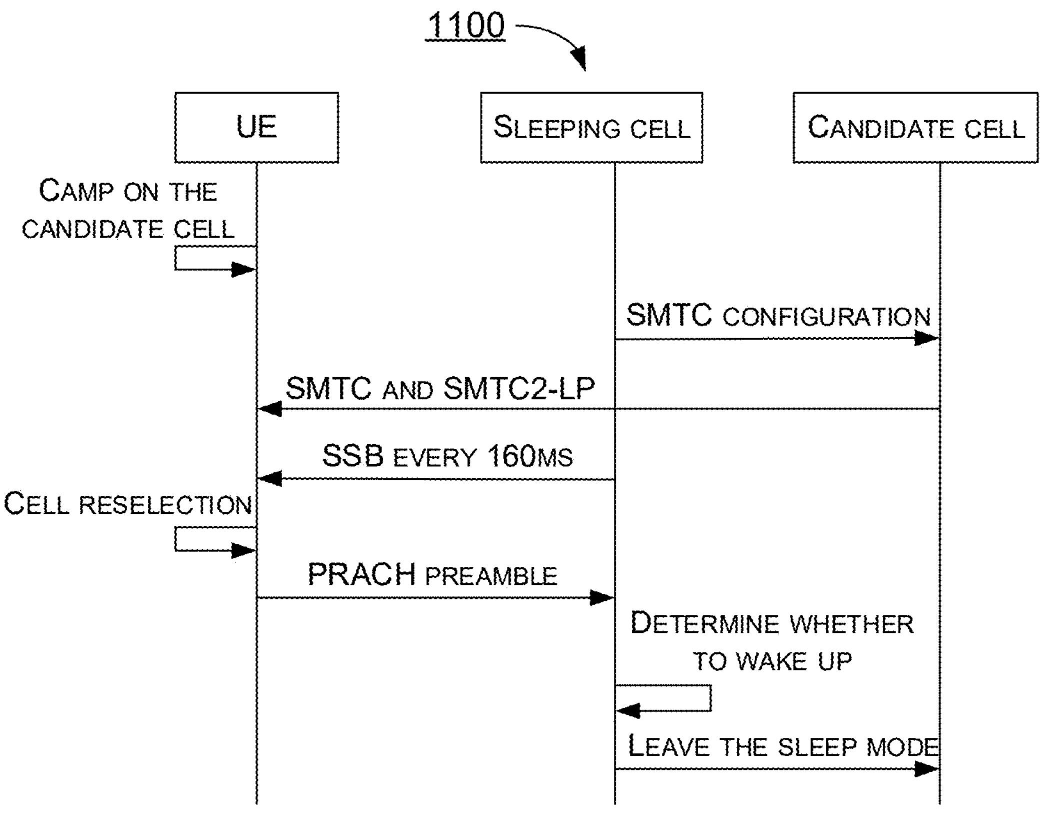
FIG. 11 is a diagram depicting an example scenario of transmitting SSB with long period under schemes in accordance with implementations of the present disclosure.

FIG. 11 illustrates an example scenario 1100 of transmitting SSB with long period under schemes in accordance with implementations of the present disclosure. Scenario 1100 involves a plurality of network nodes (e.g., a macro base station and multiple micro base stations) and a plurality of UEs, which may be a part of a wireless communication network (e.g., an LTE network, a 5G/NR network, an IoT network or a 6G network). The sleeping cell may broadcast SSB using a long period, e.g., 160 ms, rather than a normal period of 20 ms. This may maximize the potential of enabling the sleep modes of turning off power-draining components, e.g., a power amplifier. The UE may not access the sleeping cell directly, but the UE may camp on the candidate cells. If smtc2-LP is present in SIB2 or SIB4 broadcasted by the candidate cell, the UE may build up the synchronization with the sleeping cell based on the SSB timing information. If smtc2-LP is present, the UE may set up an additional SSB measurement timing configuration (SMTC) for cell reselection by the received periodicity parameter in the smtc2-LP and use the offset and duration from the smtc. The UE may perform SSB measurements according to the S criteria, i.e., the serving cell RSRP is low. The detected cells may be ranked according to the R criteria using averaged RSRP results. The UE may perform cell reselection to the highest-ranked cell. The parameters of the S criteria and R criteria are provided in SIB1. The UE may not consider any blacklisted cells as candidates for cell reselection. The UE may consider only the whitelisted cells, if configured, as candidates for cell reselection.

Not all long period cells are sleeping cells. Some of them may not be waked up forever or be waked up in a short time. Therefore, the UE may determine whether to access a sleeping cell based on its quality of service (QOS) requirement.

Figure 12:
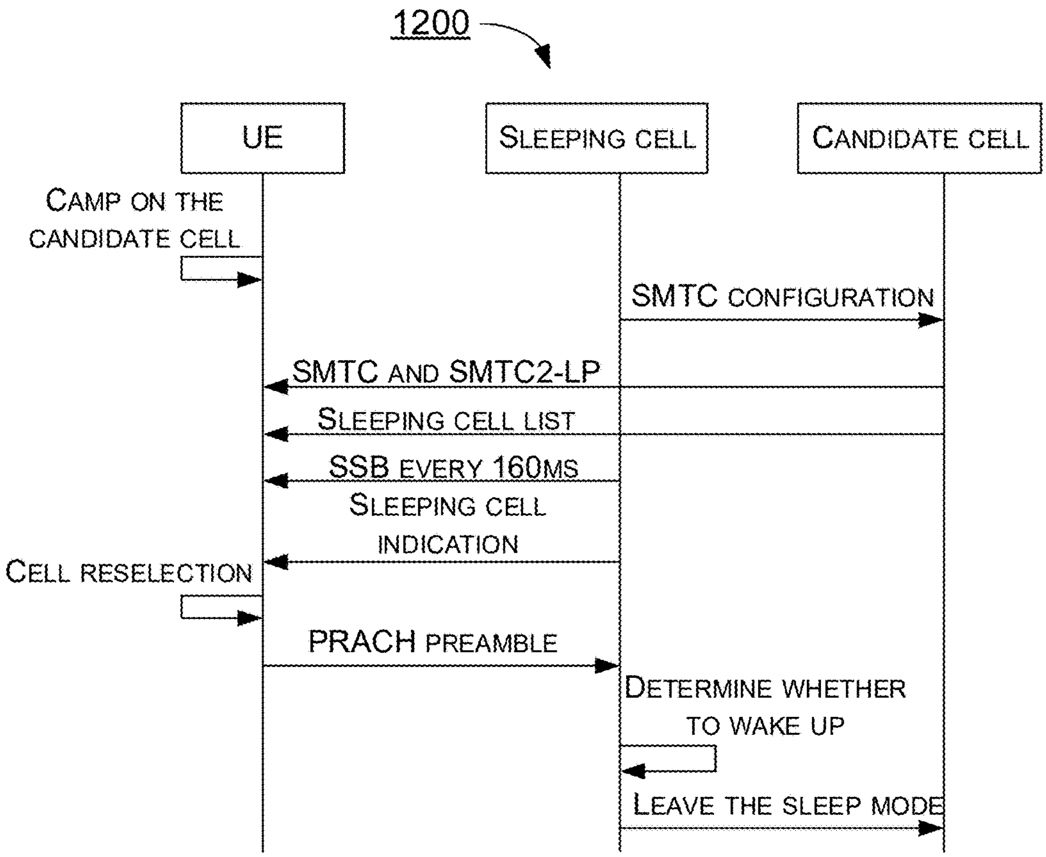
FIG. 12 is a diagram depicting an example scenario of transmitting sleeping cell list and sleeping cell indication under schemes in accordance with implementations of the present disclosure.

FIG. 12 illustrates an example scenario 1200 of transmitting sleeping cell list and sleeping cell indication under schemes in accordance with implementations of the present disclosure. Scenario 1200 involves a plurality of network nodes (e.g., a macro base station and multiple micro base stations) and a plurality of UEs, which may be a part of a wireless communication network (e.g., an LTE network, a 5G/NR network, an IoT network or a 6G network). The candidate cell may provide a list of sleeping cells. The UE may not consider any sleeping cells as candidates for cell reselection if the UE has a low latency requirement. Otherwise, the UE may consider sleeping cells as high-priority candidates for cell reselection. In addition, the sleeping cell may have a one-bit indication in MIB or SIB1. The one-bit indication "asleep" means that the cell is sleeping, and the one-bit indication "awake" means that the cell is working. The UE may exclude the sleeping cell as a candidate for cell selection/reselection for 3 seconds if the UE has a low latency requirement.

If a sleeping cell is not fully overlaid on any other cells, it means that the sleeping cell is a standalone sleeping cell. The sleeping cell may transmit SSB with a period longer than 20 ms. However, the UE may not access the sleeping cell directly because the UE may perform the initial cell search assuming the SSB period of 20 ms by default. Therefore, the present disclosure proposes some solutions to resolve the issues.

Figure 13:
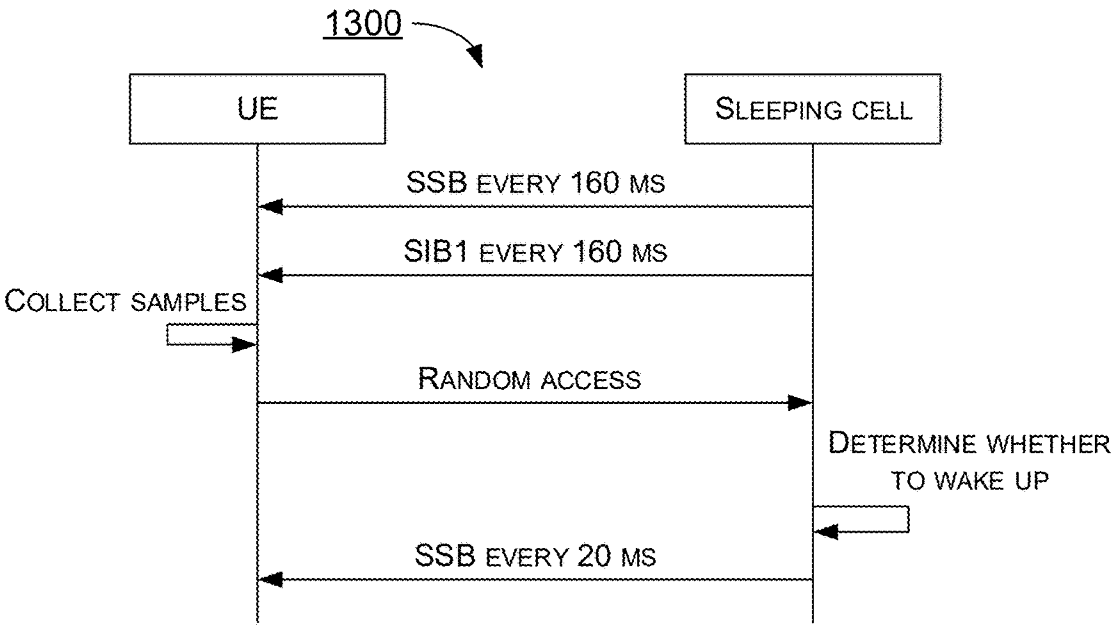
FIG. 13 is a diagram depicting an example scenario of transmitting SSB with long period for standalone sleeping cell under schemes in accordance with implementations of the present disclosure.

FIG. 13 illustrates an example scenario 1300 of transmitting SSB with long period for standalone sleeping cell under schemes in accordance with implementations of the present disclosure. Scenario 1300 involves a plurality of network nodes (e.g., a macro base station and multiple micro base stations) and a plurality of UEs, which may be a part of a wireless communication network (e.g., an LTE network, a 5G/NR network, an IoT network or a 6G network). The UE may average five samples to detect primary synchronization signal (PSS)/secondary synchronization signal (SSS) every 100 ms (20 ms per sample). If the average signal to noise ratio (SNR) of the samples exceeds −6 dB SNR, the UE may identify the sleeping cell with 75% to 80% cell ID detection accuracy for one-shot detection. The UE may filter the SS-RSRP and SS-reference signal received quality (RSRQ) measurements of the serving cell using at least two measurements. For frequency range 1 (FR1), a cell may support to provide sleeping cell indication, SSB and CORESET multiplexing in frequency division multiplexing (FDM), i.e., multiplexing patterns pattern 2 and pattern 3. The UE may find the SIB1 based on the new assumption, or there may be a new indication provided in MIB.

However, the UE may detect a cell with SS block periodicity higher than 20 ms with a very low probability since the default periodicity assumed by a device is 20 ms. Especially, the UE may filter the measurement using at least two measurements, which may degrade the detection accuracy further. Therefore, in order to the above issue, the present disclosure may propose some solutions to resolve the issue below.

Figure 14:
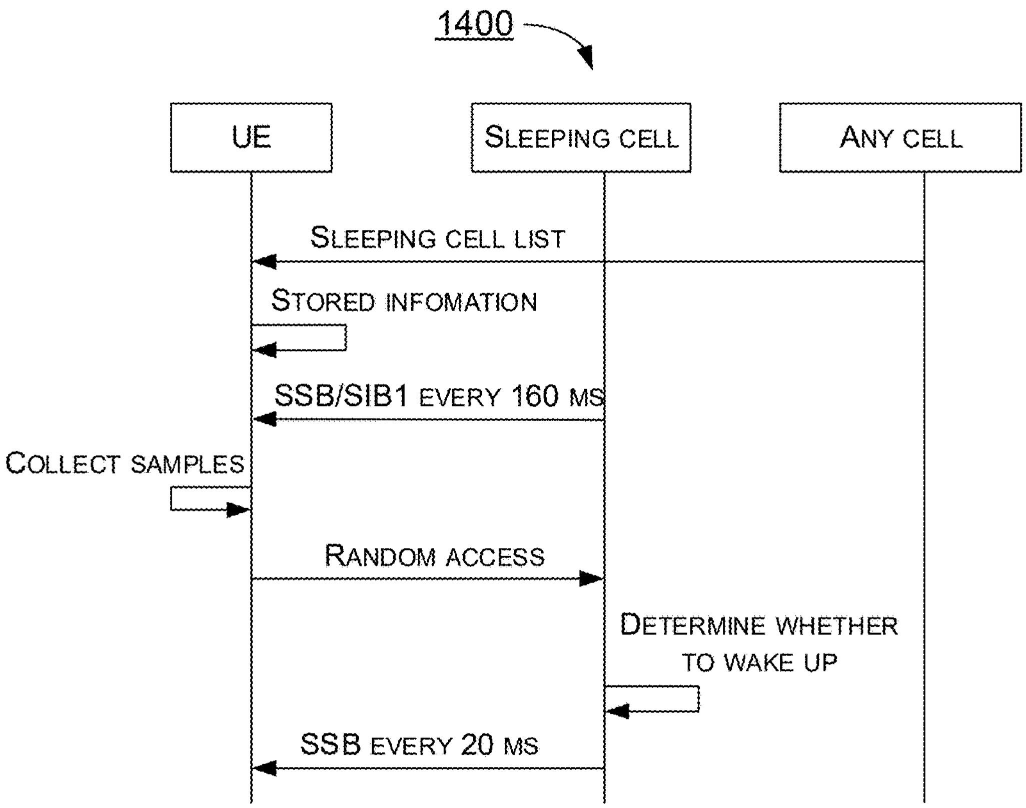
FIG. 14 is a diagram depicting an example scenario of leveraging stored information under schemes in accordance with implementations of the present disclosure.

FIG. 14 illustrates an example scenario 1400 of leveraging stored information under schemes in accordance with implementations of the present disclosure. Scenario 1400 involves a plurality of network nodes (e.g., a macro base station and multiple micro base stations) and a plurality of UEs, which may be a part of a wireless communication network (e.g., an LTE network, a 5G/NR network, an IoT network or a 6G network). Cell selection may be performed by one of the following two procedures: 1) Initial cell selection and 2) Cell selection by leveraging stored information.

In initial cell selection (no prior knowledge of which RF channels are NR frequencies), the UE may scan all RF channels in the NR bands according to its capabilities to find a suitable cell. The UE may need only search for the strongest cell on each frequency, except for operation with shared spectrum channel access where the UE may search for the next strongest cell(s). Once a suitable cell is found, this cell will be selected.

In cell selection by leveraging stored information, this procedure requires stored frequencies and information on cell parameters from previously received measurement control information elements or from previously detected cells. Once the UE has found a suitable cell, the UE may select the suitable cell. If no suitable cell is found, the initial cell selection procedure in a) will be started.

The UE may scan NR bands for the initial cell selection by the default SSB period of 20 ms and a long SSB period, e.g., 80 ms, according to its capabilities to find a sleeping cell.

For the cell selection by leveraging stored information, the UE may store the cell parameters from previously received measurement control IE or from previously detected cells. The cell parameters may include the SSB period and indicate whether the cell supports a sleep mode. For example, the UE may store a sleeping cell list for a frequency band from measIdleConfig in RRCRelease via RRC when the UE is in RRC_CONNECTED for any other cells. That is, the UE may obtain the information for waking the sleeping cell up from another cell. When the sleeping cell wakes up, the sleeping may use cell normal period of 20 ms to transmit SSB.

The UE may use the latest unfiltered L1-RSRP measurement for a sleeping cell rather than using at least two measurements if an indication is provided in SIB.

Figure 15:
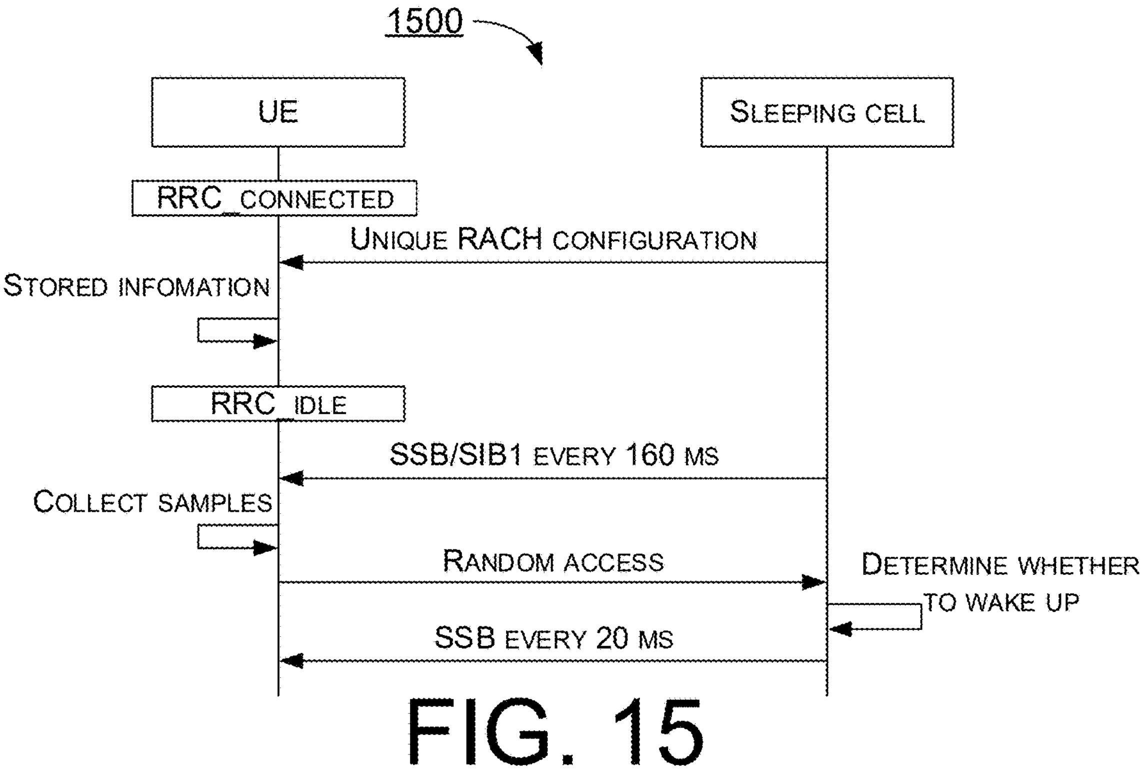
FIG. 15 is a diagram depicting an example scenario of unique RACH configuration under schemes in accordance with implementations of the present disclosure.

FIG. 15 illustrates an example scenario 1500 of unique RACH configuration under schemes in accordance with implementations of the present disclosure. Scenario 1500 involves a plurality of network nodes (e.g., a macro base station and multiple micro base stations) and a plurality of UEs, which may be a part of a wireless communication network (e.g., an LTE network, a 5G/NR network, an IoT network or a 6G network). If a UE has connected to the sleeping cell once, the sleeping cell may provide a unique RACH configuration for the UE to wake up the sleeping cell. The UE may receive the unique RACH configuration via RRC before detaching the sleeping cell, such as RRCRelease or RRCReconfiguration.

The network node in the sleeping mode may not provide normal service. Therefore, the present disclosure proposes some solutions to resolve the issues.

In accordance with implementations of the present disclosure, in order to stop the initiated random access (RA) procedure, the UE may receive an early termination indication (ETI) in Msg2 or Msg4. The ETI may exist if a sleeping cell indication (SCI) is present in SIB. If the UE receives the ETI and other assistant information, e.g., a sleeping cell ID or a carrier frequency, the UE may go to RRC_IDLE and perform cell selection or cell reselection.

The UE may keep sending BS-WUS to fit its QoS. However, it may lead to the power waste of the UE. Therefore, the present disclosure proposes some solutions to resolve the issues.

In accordance with implementations of the present disclosure, the prohibit timer may start when UE sends a BS-WUS. When the prohibit timer runs, the UE may not be permitted to send another BS-WUS. The prohibit timer value may be provided in SIB.

When the UE cannot find a suitable cell, the UE may need to wake up any sleeping cell nearby. The legacy random access (RA) procedure may be reused to minimize spec impact, e.g., the legacy cell may not know the signaling based on new spec from the sleeping cell.

Figure 16:
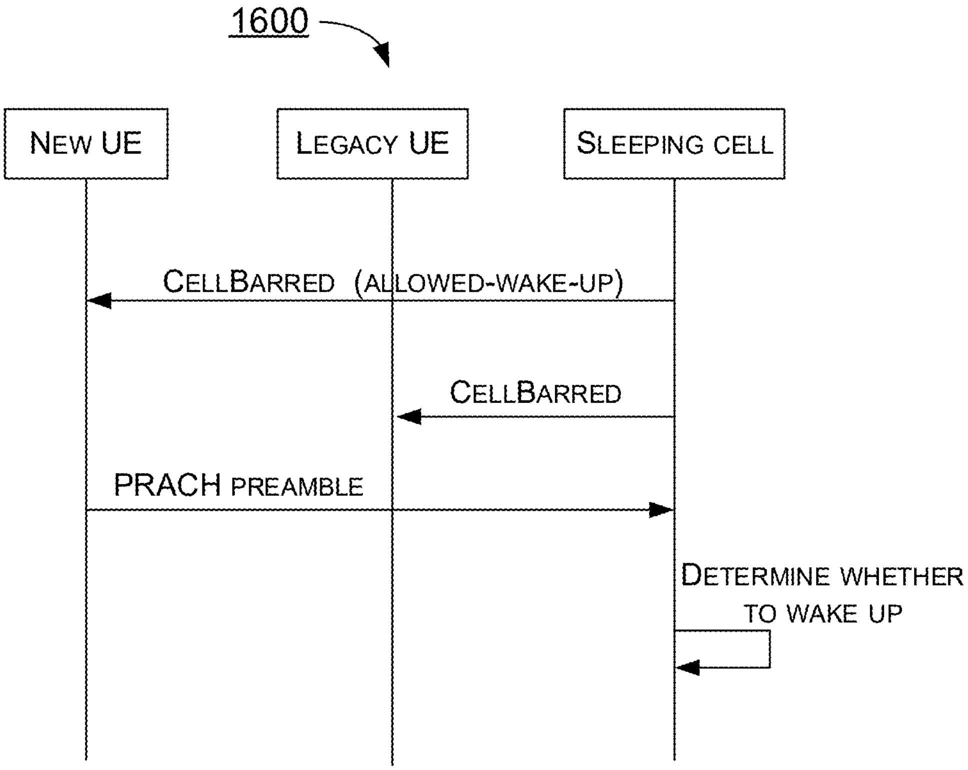
FIG. 16 is a diagram depicting an example scenario of cellBarred indication under schemes in accordance with implementations of the present disclosure.

FIG. 16 illustrates an example scenario 1600 of cellBarred indication under schemes in accordance with implementations of the present disclosure. Scenario 1600 involves a plurality of network nodes (e.g., a macro base station and multiple micro base stations) and a plurality of UEs, which may be a part of a wireless communication network (e.g., an LTE network, a 5G/NR network, an IoT network or a 6G network). The sleeping cell may broadcast the cellBarred in MIB set to "barred" to prevent the legacy UE. If the UE is in RRC_IDLE or RRC_INACTIVE, or if UE is in RRC_CONNECTED while T311 timer is running, the UE may consider the cell as "barred", and perform cell re-selection to other cells on the same frequency as the barred cell. Therefore, the legacy UE may not be allowed to camp on the sleeping cell.

A new cellBarred bit may be provided in MIB or SIB1 and denoted by allowed-wake-up. The cellBarred bit may be an always present bit as ENUMERATED {allowed, notAllowed}, or optionally present bit as ENUMERATED {allowed}. When the UE receives the allowed-wake-up field set to "allowed" in a cell, the UE may ignore cellBarred bit, and perform cell selection and random access on the cell, i.e., the new UE may be allowed to camp on the sleeping cell.

Illustrative Implementations

Figure 17:
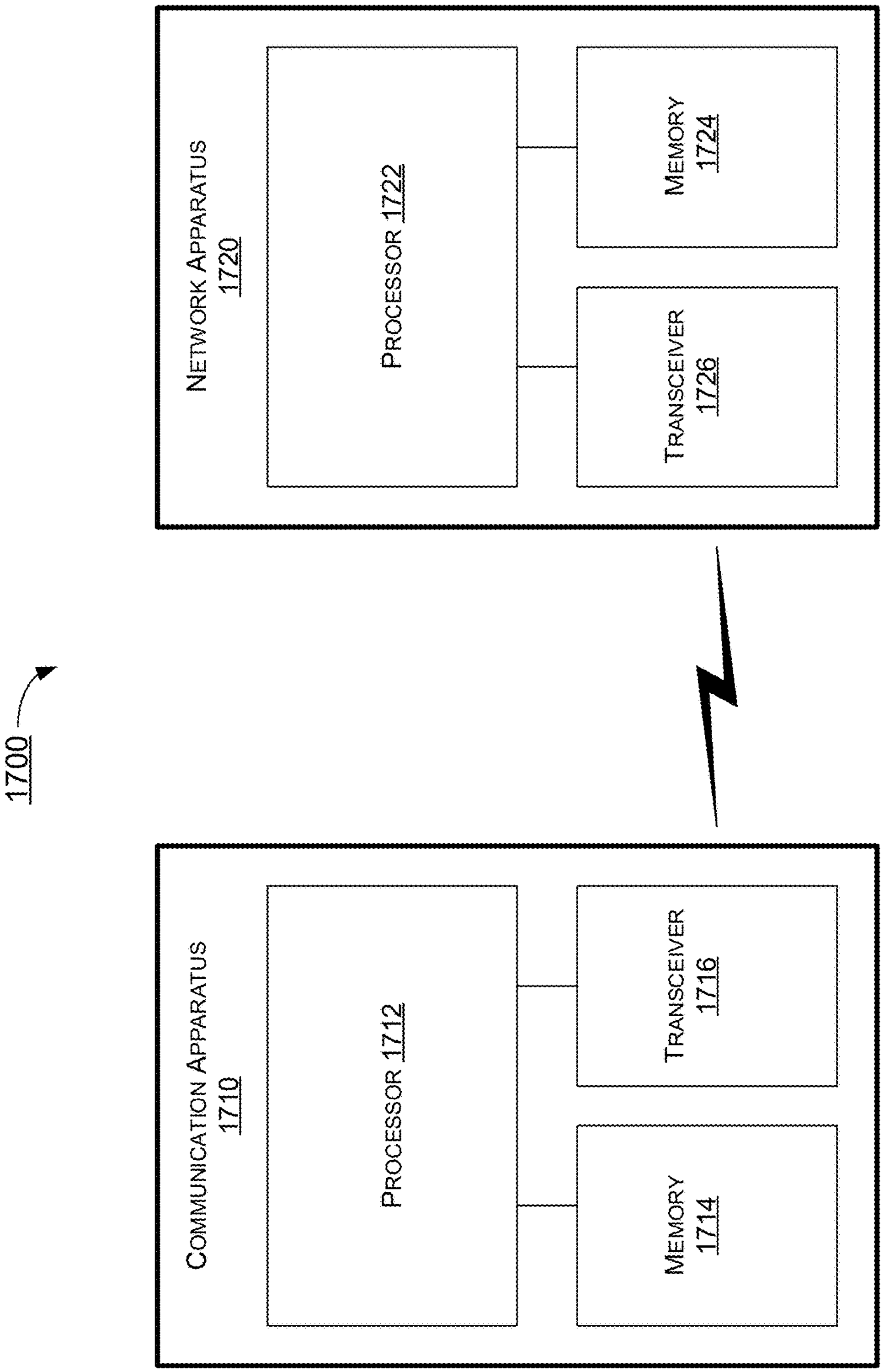
FIG. 17 is a block diagram of an example communication system in accordance with an implementation of the present disclosure.

FIG. 17 illustrates an example communication system 1700 having an example communication apparatus 1710 and an example network apparatus 1720 in accordance with an implementation of the present disclosure. Each of communication apparatus 1710 and network apparatus 1720 may perform various functions to implement schemes, techniques, processes and methods described herein pertaining to transmitting WUS for network energy saving with respect to user equipment and network apparatus in mobile communications, including scenarios/schemes described above as well as processes 1800 and 1900 described below.

Communication apparatus 1710 may be a part of an electronic apparatus, which may be a UE such as a portable or mobile apparatus, a wearable apparatus, a wireless communication apparatus or a computing apparatus. For instance, communication apparatus 1710 may be implemented in a smartphone, a smartwatch, a personal digital assistant, a digital camera, or a computing equipment such as a tablet computer, a laptop computer or a notebook computer. Communication apparatus 1710 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 1710 may be implemented in a smart thermostat, a smart fridge, a smart door lock, a wireless speaker or a home control center. Alternatively, communication apparatus 1710 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 1710 may include at least some of those components shown in FIG. 17 such as a processor 1712, for example. Communication apparatus 1710 may further include one or more other components not pertinent to the proposed scheme of the present disclosure (e.g., internal power supply, display device and/or user interface device), and, thus, such component(s) of communication apparatus 1710 are neither shown in FIG. 17 nor described below in the interest of simplicity and brevity.

Network apparatus 1720 may be a part of a network apparatus, which may be a network node such as a satellite, a base station, a small cell, a router or a gateway. For instance, network apparatus 1720 may be implemented in an eNodeB in an LTE network, in a gNB in a 5G/NR, IoT, NB-IoT or IIoT network or in a satellite or base station in a 6G network. Alternatively, network apparatus 1720 may be implemented in the form of one or more IC chips such as, for example and without limitation, one or more single-core processors, one or more multi-core processors, or one or more RISC or CISC processors. Network apparatus 1720 may include at least some of those components shown in FIG. 17 such as a processor 1722, for example. Network apparatus 1720 may further include one or more other components not pertinent to the proposed scheme of the present disclosure (e.g., internal power supply, display device and/or user interface device), and, thus, such component(s) of network apparatus 1720 are neither shown in FIG. 20 nor described below in the interest of simplicity and brevity.

In one aspect, each of processor 1712 and processor 1722 may be implemented in the form of one or more single-core processors, one or more multi-core processors, or one or more CISC processors. That is, even though a singular term "a processor" is used herein to refer to processor 1712 and processor 1722, each of processor 1712 and processor 1722 may include multiple processors in some implementations and a single processor in other implementations in accordance with the present disclosure. In another aspect, each of processor 1712 and processor 1722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1712 and processor 1722 is a special-purpose machine specifically designed, arranged and configured to perform specific tasks including autonomous reliability enhancements in a device (e.g., as represented by communication apparatus 1710) and a network (e.g., as represented by network apparatus 1720) in accordance with various implementations of the present disclosure.

In some implementations, communication apparatus 1710 may also include a transceiver 1716 coupled to processor 1712 and capable of wirelessly transmitting and receiving data. In some implementations, communication apparatus 1710 may further include a memory 1714 coupled to processor 1712 and capable of being accessed by processor 1712 and storing data therein. In some implementations, network apparatus 1720 may also include a transceiver 1726 coupled to processor 1722 and capable of wirelessly transmitting and receiving data. In some implementations, network apparatus 1720 may further include a memory 1724 coupled to processor 1722 and capable of being accessed by processor 1722 and storing data therein. Accordingly, communication apparatus 1710 and network apparatus 1720 may wirelessly communicate with each other via transceiver 1716 and transceiver 1726, respectively. To aid better understanding, the following description of the operations, functionalities and capabilities of each of communication apparatus 1710 and network apparatus 1720 is provided in the context of a mobile communication environment in which communication apparatus 1710 is implemented in or as a communication apparatus or a UE and network apparatus 1720 is implemented in or as a network node of a communication network.

In some implementations, processor 1712 may receive, via transceiver 1716, information for waking up a sleeping cell from network apparatus 1720. Processor 1712 may transmit, via transceiver 1716, a WUS to network apparatus 1720 based on the information to wake up the sleeping cell. The WUS is used to request a transition from no or reduced transmission or reception activity to active transmission or reception activity of a channel or a signal, or is used to trigger an SSB or SIB transmission.

In some implementations, processor 1712 may receive, via transceiver 1716, at least one handover condition with a list of candidate cells from network apparatus 1720 before network apparatus 1720 enters a sleep mode or leaves the sleep mode. Processor 1712 may determine a candidate cell to access based on the list of candidate cells.

In some implementations, processor 1712 may receive, via transceiver 1716, an assistant information for a cell selection or a cell re-selection from network apparatus 1720. Processor 1712 may perform the cell selection or the cell re-selection based on the assistant information.

In some implementations, the assistant information comprises a cellBarred bit for network energy savings in a master information block (MIB) or a system information block 1 (SIB1).

In some implementations, processor 1712 may ignore the cellBarred bit in an event that the MIB or the SIB1 provides an indication to wake up the sleeping cell, wherein communication apparatus 1710 has capability to transmit the WUS or to parse an early termination indication (ETI). In some implementations, processor 1712 may determine not to camp on the sleeping cell after reading the cellBarred bit.

In some implementations, processor 1712 may receive, via transceiver 1716, an indication to select an omnidirectional beam from network apparatus 1720. Processor 1712 may perform an access procedure to access the sleeping cell by using the omnidirectional beam.

In some implementations, the information comprises a specific physical random access channel (PRACH) configuration.

In some implementations, the information comprises a SSB measurement timing configuration (SMTC) from a candidate cell.

In some implementations, processor 1712 may receive, via transceiver 1716, a sleeping cell list from the candidate cell to determine the sleeping cell. In some implementations, processor 1712 may receive, via transceiver 1716, a sleeping cell indication from the sleeping cell.

In some implementations, processor 1712 may store the information. Processor 1712 may perform a cell selection or a cell reselection according to the stored information. The information is from the sleeping cell or from a candidate cell.

In some implementations, the information comprises a sleeping cell list from the candidate cell or a unique RACH configuration from the sleeping cell.

In some implementations, processor 1712 may receive, via transceiver 1716, an early termination indication (ETI) from network apparatus 1720. Processor 1712 may enter an idle mode or perform a cell selection or a cell reselection after receiving the EFI.

In some implementations, processor 1712 may start a prohibit timer. Processor 1712 may stop transmitting another WUS when the prohibit timer is running.

In some implementations, processor 1722 may transmit, via transceiver 1726, information for waking up a sleeping cell to communication apparatus 1710. Processor 1722 may receive, via transceiver 1726, a WUS from communication apparatus 1710 to wake up the sleeping cell. The WUS is used to request a transition from no or reduced transmission or reception activity to active transmission or reception activity of a channel or a signal, or is used to trigger a SSB or SIB transmission.

In some implementations, processor 1722 may transmit, via transceiver 1726, at least one handover condition with a list of candidate cells to communication apparatus 1710 before entering a sleep mode or leaving the sleep mode.

In some implementations, processor 1722 may transmit, via transceiver 1726, an assistant information for a cell selection or cell re-selection to communication apparatus 1710. In some implementations, the assistant information comprises a cellBarred bit for network energy savings in a MIB or SIB1.

In some implementations, the information may comprise a specific PRACH configuration.

In some implementations, the information may comprise a SSB SMTC from a candidate cell.

In some implementations, processor 1722 may transmit, via transceiver 1726, an early termination indication (ETI) to communication apparatus 1710 when the apparatus is in a sleep mode.

Illustrative Processes

Figure 18:
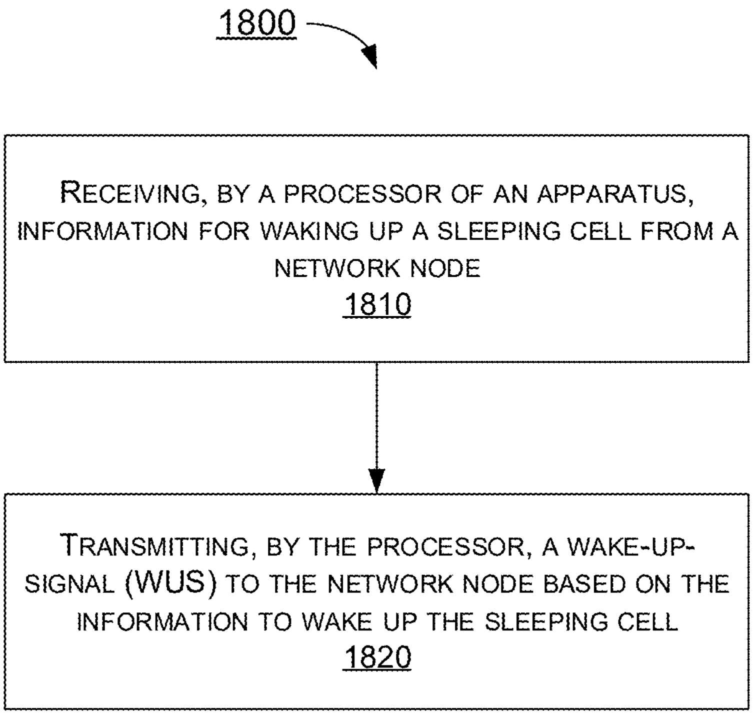
FIG. 18 is a flowchart of an example process in accordance with an implementation of the present disclosure.

FIG. 18 illustrates an example process 1800 in accordance with an implementation of the present disclosure. Process 1800 may be an example implementation of above scenarios/schemes, whether partially or completely, with respect to transmitting WUS for network energy saving with the present disclosure. Process 1800 may represent an aspect of implementation of features of communication apparatus 1710. Process 1800 may include one or more operations, actions, or functions as illustrated by one or more of blocks 1810 and 1820. Although illustrated as discrete blocks, various blocks of process 1800 may be divided into additional blocks, combined into fewer blocks, or eliminated, depending on the desired implementation. Moreover, the blocks of process 1800 may be executed in the order shown in FIG. 18 or, alternatively, in a different order. Process 1800 may be implemented by communication apparatus 1710 or any suitable UE or machine type devices. Solely for illustrative purposes and without limitation, process 1800 is described below in the context of communication apparatus 1710. Process 1800 may begin at block 1810.

At 1810, process 1800 may involve processor 1712 of communication apparatus 1710 receiving information for waking up a sleeping cell from a network node. Process 1800 may proceed from 1810 to 1820.

At 1820, process 1800 may involve processor 1712 transmitting a WUS to the network node based on the information to wake up the sleeping cell, wherein the WUS is used to request a transition from no or reduced transmission or reception activity to active transmission or reception activity of a channel or a signal, or is used to trigger a SSB or SIB transmission.

Figure 19:
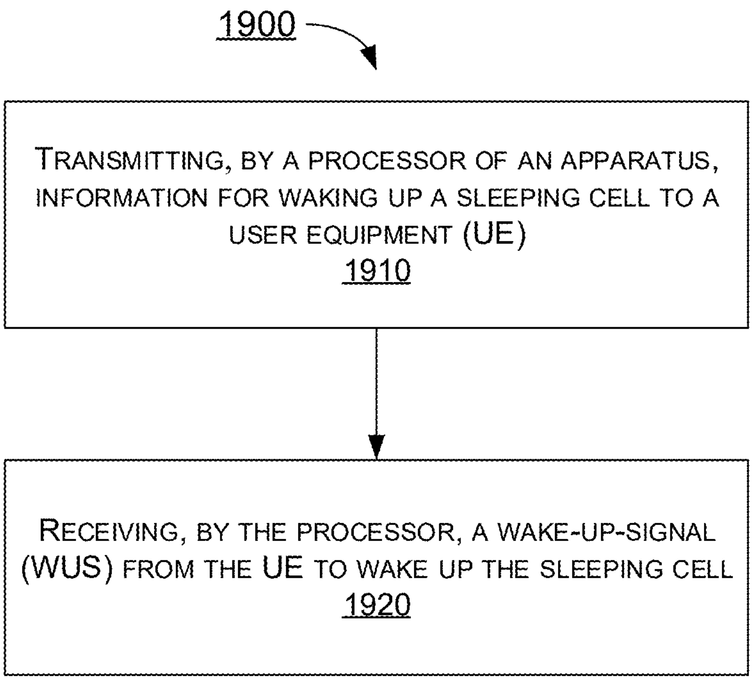
FIG. 19 is a flowchart of an example process in accordance with an implementation of the present disclosure.

FIG. 19 illustrates an example process 1900 in accordance with an implementation of the present disclosure. Process 1900 may be an example implementation of above scenarios/schemes, whether partially or completely, with respect to transmitting WUS for network energy saving with the present disclosure. Process 1900 may represent an aspect of implementation of features of network apparatus 1720. Process 1900 may include one or more operations, actions, or functions as illustrated by one or more of blocks 1910 and 1920. Although illustrated as discrete blocks, various blocks of process 1900 may be divided into additional blocks, combined into fewer blocks, or eliminated, depending on the desired implementation. Moreover, the blocks of process 1900 may be executed in the order shown in FIG. 19 or, alternatively, in a different order. Process 1900 may be implemented by network apparatus 1920 or any base stations or network nodes. Solely for illustrative purposes and without limitation, process 1900 is described below in the context of network apparatus 1720. Process 1900 may begin at block 2210.

At 1910, process 1900 may involve processor 1722 of network apparatus 1720 transmitting, by a processor of an apparatus, information for waking up a sleeping cell to a UE. Process 1900 may proceed from 1910 to 1920.

At 1920, process 1900 may involve processor 1722 receiving a WUS from the UE to wake up the sleeping cell, wherein the WUS is used to request a transition from no or reduced transmission or reception activity to active transmission or reception activity of a channel or a signal, or is used to trigger a SSB or SIB transmission.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

receiving, by a processor of an apparatus, information for waking up a sleeping cell from a network node, wherein the information comprises a specific physical random access channel (PRACH) configuration; and transmitting, by the processor, a wake-up-signal (WUS) to the network node based on the information to wake up the sleeping cell, wherein the WUS is transmitted using a PRACH preamble based on the specific PRACH configuration, wherein the WUS is used to request a transition from no or reduced transmission or reception activity to active transmission or reception activity of a channel or a signal, or is used to trigger a synchronization signal block (SSB) or system information block (SIB) transmission wherein the method further comprises:

receiving, by the processor, an assistant information for a cell selection or a cell re-selection from the network node;

performing, by the processor, the cell selection or the cell re-selection based on the assistant information, wherein the assistant information comprises a cellBarred bit for network energy savings in a master information block (MIB) or a system information block 1 (SIB1); and ignoring, by the processor, the cellBarred bit in an event that the MIB or the SIB1 provides an indication to wake up the sleeping cell, wherein the apparatus has capability to transmit the WUS or to parse an early termination indication (ETI).

2. The method of claim 1, further comprising:

receiving, by the processor, at least one handover condition with a list of candidate cells from the network node before the network node enters a sleep mode or leaves the sleep mode; and determining, by the processor, a candidate cell to access based on the list of candidate cells.

3. The method of claim 1, further comprising:

determining, by the processor, not to camp on the sleeping cell after reading the cellBarred bit.

4. The method of claim 1, further comprising:

receiving, by the processor, an indication to select an omnidirectional beam from the network node; and performing, by the processor, an access procedure to access the sleeping cell by using the omnidirectional beam.

5. The method of claim 1, wherein the information comprises an SSB measurement timing configuration (SMTC) from a candidate cell.

6. The method of claim 5, further comprising:

receiving, by the processor, a sleeping cell list from the candidate cell to determine the sleeping cell; or receiving, by the processor, a sleeping cell indication from the sleeping cell.

7. The method of claim 1, further comprising:

storing, by the processor, the information; and performing, by the processor, a cell selection or a cell reselection according to the stored information, wherein the information is from the sleeping cell or from a candidate cell.

8. The method of claim 7, wherein the information comprises a sleeping cell list from the candidate cell or a unique RACH configuration from the sleeping cell.

9. The method of claim 1, further comprising:

receiving, by the processor, the ETI from the network node; and entering, by the processor, an idle mode or performing a cell selection or a cell reselection after receiving the ETI.

10. The method of claim 1, further comprising:

starting, by the processor, a prohibit timer; and stopping, by the processor, transmitting another WUS when the prohibit timer is running.

11. A method, comprising:

transmitting, by a processor of an apparatus, information for waking up a sleeping cell to a user equipment (UE), wherein the information comprises a specific physical random access channel (PRACH) configuration; and receiving, by the processor, a wake-up-signal (WUS) from the UE to wake up the sleeping cell, wherein the WUS is transmitted using a PRACH preamble based on the specific PRACH configuration, wherein the WUS is used to request a transition from no or reduced transmission or reception activity to active transmission or reception activity of a channel or a signal, or is used to trigger a synchronization signal block (SSB) or system information block (SIB) transmission, wherein the method further comprises:

transmitting, by the processor, an assistant information for a cell selection or cell re-selection to the UE, wherein the assistant information comprises a cellBarred bit for network energy savings in a master information block (MIB) or system information block 1 (SIB1).

12. The method of claim 11, further comprising:

transmitting, by the processor, at least one handover condition with a list of candidate cells to the UE before entering a sleep mode or leaving the sleep mode.

13. The method of claim 11, wherein the information comprises an SSB measurement timing configuration (SMTC) from a candidate cell.

14. The method of claim 11, further comprising:

transmitting, by the processor, an early termination indication (ETI) to the UE when the apparatus is in a sleep mode.

* * * * *